United States Patent Office 3,405,008
Patented Oct. 8, 1968

3,405,008
FUEL CELL AND FUEL CELL ELECTRODE CONTAINING NICKEL-RARE EARTH INTERMETALLIC CATALYST
Louis R. Dilworth, Milwaukee, and Wayne J. Wunderlin, West Allis, Wis., assignors to Allis-Chalmers Manufacturing Company, Milwaukee, Wis.
No Drawing. Filed Mar. 31, 1965, Ser. No. 444,443
5 Claims. (Cl. 136—86)

This invention relates to improved anode catalysts for activating fuel half-cell reactions within fuel cells. More particularly, this invention deals with fuel cell anodes comprising certain intermetallic compounds of nickel that electrochemically activate fuel cell fuels such as hydrogen, hydrazine, ammonia; and alcohols, esters, carboxylates, hydrocarbons and carbonyl compounds of up to about 14 carbon atoms.

The term fuel cell, as used herein, refers to those electrochemical devices that convert the free energy of a chemical reaction directly to electrical energy. Such devices are well known in the art and although there are differences between various cells, a discussion of some of their common characteristics and problems will aid in the understanding of our invention.

As is known, oxidation-reduction reactions are accompanied by the transfer of electrons from the reductant to the oxidant. In individual fuel cells, the oxidation reaction and reduction reaction take place at spacially separated electrodes. At each electrode there occurs what is called a half-cell reaction. One electrode, called the anode, is the site of the oxidation half-cell reaction. A reactant, referred to as the fuel, that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

Although the reaction between oxidant and fuel is thermodynamically spontaneous, in cells operated at less than about 95° C., a catalyst is necessarily employed to bring the reactants to an activated state. The energy input required to reach an activated state, i.e. heat of activation, partly determines the speed of reaction. Through a mechanistic bypass a catalyst brings about reaction with a smaller heat of activation.

Nickel electrodes have found extensive use as anodes in fuel cells having a caustic electrolyte. In so-called low temperature operation efficiency demands that the porous nickel electrode base carry a deposit of a catalyst such, for example, as platinum group metals and oxides of the transition series elements upon its surface.

Hence, the general object of our invention is the provision of a catalytic fuel cell anode that is superior to nickel and yet comprises a non noble metal.

A further object of our invention is to provide an electrode that carries an intermetallic of nickel that retains its catalytic properties during fabrication.

A still further object of our invention is to provide an electrode comprising a metal powder that is bound together without the use of sintering.

Briefly we have discovered that the intermetallics of nickel having the empirical formula $Ni_5M$ where M represents a metal selected from the group consisting of yttrium, lanthanum, cerium, praseodymium, neodymium, samarium, europium, gadolinium, terbium, dysprosium, holmium, erbium, thulium, ytterbium and lutetium catalytically activate typical fuel cell anode reactions. These intermetallics are hereinafter often referred to as the catalytic material.

Techniques for preparing the intermetallics are well known and metallurgically straight forward. Furthermore, the products are easily identifiable because of their individual and unique crystallographic structure. All form hexagonal crystals of the $CaCu_5$ type.

The compounds can be formed by several common melting techniques, restricted only by the necessity to control the environment over the melt. An inert gas or vacuum environment is required to minimize oxidation and the deleterious effect it has on the catalytic activity of these materials.

We have found the following methods particularly suitable to produce our catalytic material. In each case, a compressed pellet, for example, 40 to 50 grams in weight, was made from a stoichiometric mixture of the powdered constituents.

In our earliest efforts, the pellets were placed in a stainless steel tube mounted within a resistance furnace, the tube evacuated and heated to 1000° C. for 4 days. This temperature was well below the melting temperature, yet did allow for solid state diffusion and formation of the intermetallic.

Much cleaner products are obtained by actually melting the pressed admixture of powders. One method involved the use of induction heating of the materials supported on a water-cooled copper hearth within an evacuated heat resistant glass tube. A second method utilized a standard arc melter in which the protective environment was helium at a partial pressure of 10–11 p.s.i. In both the above methods excellent stirring of the melt pellets is obtained and so homogeneity of the pellets is assured.

The cooled melts are then ground to particles suitable for fabrication into fuel cell electrodes. One ought to be warned that these intermetallics exhibit pyrophorric tendencies when reduced to a particle size of a few microns. Under normal precautionary handling procedures, or if wet, they are, however, quite safe.

Although our newly discovered catalytic materials have demonstrated catalytic activity in laboratory test cells, attempts to fabricate fuel cell electrodes suitable for commercial use have met with failure. Temperatures high enough to sinter the powdered intermetallics into a porous self-supporting electrode comprising only catalytic material destroy or seriously reduce the material's catalytic activity. Furthermore, unlike some known catalysts, our catalytic material cannot be plated onto or precipitated within an electrode substrate such as a porous carbon or nickel sheet.

We have found that the catalyst material is preferably dispersed throughout a compatible support framework. The support framework must impart cohesion to a plaque type electrode, must contain the catalyst particles and allow contact for the development of electronic conductivity, must not be galvanically active when coupled with the catalyst material, and must be chemically inert within a fuel cell environment thereby negating the production of reaction by-products that would poison the catalyst. Furthermore, when installed in a fuel cell, the framework and catalytic material comprising the electrode must have the proper porosity for permeation of electrolyte and reactant.

Thermoplastics have been found especially well suited to serve as the support framework for containing the catalytic material. With thermoplastics no other bonding agent is required.

Some plastic binders, for example, polytetrafluoroethylene can be added and mixed with the particles of catalytic material. After forming into the desired shape, this mixture requires only low temperature sintering to form a cohesive electrode plaque.

Certain foamed plastics are not entirely satisfactory for the electrode frame work. Neoprene, urethane, and polyvinyl chloride foam all poisoned the catalyst to some degree. Furthermore, the urethane foam undergoes some thermal decomposition and electronic conductivity is established only with difficulty when using polyvinyl chloride foam.

Felted plastic materials are much preferable to either foams or powders, and of these polypropylene, polyethylene, polyesters, acrilics, rayon viscose and nylons have been found satisfactory.

In the preferred embodiment of our invention the catalytic material produced, for example, by co-melting the constituents is cooled and then initially ground to a particle size of 150 microns or less. These initial ground particles are then further reduced in size. The second grinding is suitably performed in either a vibrating ball mill or in a rotating jar mill. Because grinding in a ball mill can produce sufficient heat to oxidize the finer particles of catalytic material, we prefer to use a jar mill. A jar mill, although slower and producing a powder contained within a slurry, has the advantage of a larger capacity and allowing the catalytic material to remain at room temperature and if desired, under a protective inert atmosphere within the seal mill.

The powder after all being ground to less than 44 microns is mixed with sufficient water to form a slurry. Of course, if ground in a jar mill, the catalytic material is already in a slurry. The slurry is pulled through a suitably sized piece of polypropylene felt by means of a suction. The felt acting as a filter, entraps particles within its interstices. To start formation of a filter cake, it is desirable to use a very fine filter below the felt. After formation of the filter cake the polypropylene belt framework now carrying the catalytic material is compressed so as to form a cohesive catalytic electrode plaque.

Electrode pore size distribution and porosity can be controlled by the choice of sized particles and by the choice of pressures used in compressing the felt after addition of the powder. The electrode formed in the desired shape and thickness is preferably installed within a fuel cell in a wet condition, thereby reducing any danger associated with the pyrophorric tendencies of the intermetallic catalysts when in a fine particle size.

When installed as the anode in a hydrogen/oxygen fuel cell having a 25% by weight potassium hydroxide electrolyte and operated between 75°–83° C., the following exemplary outputs were noted:

| Load (ASF) | Anode ½ cell voltage | Cell voltage | Cell voltage IR free |
|---|---|---|---|
| $Ni_5Pr$: | | | |
| 100 | 1.045 | 0.795 | |
| 150 | 0.98 | 0.730 | |
| 200 | | 0.700 | 0.790 |
| $Ni_5Misch$ metal: | | | |
| 100 | 1.045 | 0.800 | 0.880 |
| 150 | 0.995 | 0.725 | 0.835 |
| 200 | 0.935 | 0.630 | 0.775 |

The embodiments of the invention in which an exclusive property or privilege is claimed are defined as follows:

1. An improved fuel cell having a housing; anode and cathode electrodes mounted within said housing in spaced relation to each other; an electrolyte disposed between said electrodes; means for supplying a fuel to the anode and means for supplying an oxidant to the cathode; said improvement consisting of said anode comprising a nickel intermetallic catalytic material having the formula $Ni_5M$ where M is a metal selected from the group consisting of yttrium, lanthanum, cerium, praseodymium, neodymium, samarium, europium, gadolinium, terbium, dysprosium, holmium, erbium, thulium, ytterbium, and lutetium and a support member carrying said catalytic material.

2. An improved fuel cell according to claim 1 in which said support member comprises a thermoplastic binder; and said catalytic material is in a particulate form bound into an electrically conductive cohesive mass.

3. An improved fuel cell according to claim 1 in which said support member comprises a thermoplastic felt having a myriad of interstices and said catalytic material dispersed within said interstices.

4. A fuel cell electrode comprising a fibrous thermoplastic sheet; said sheet having its intertwined fibers forming a myriad of interstices; and particles of a catalytic material selected from the group consisting of a nickel intermetallic having the formula $Ni_5M$ where M is a metal selected from the group consisting of yttrium, lanthanum, cerium, praseodymium, neodymium, samarium, europium, gadolinium, terbium, dysprosium, holmium, erbium, thulium, ytterbium, and lutetium dispersed within said interstices.

5. An electrode according to claim 5 in which said thermoplastic is polypropylene.

References Cited

UNITED STATES PATENTS

| | | | |
|---|---|---|---|
| 3,276,909 | 10/1966 | Moos | 136—86 |
| 3,297,489 | 1/1967 | Feng et al. | 136—120 |

OTHER REFERENCES

Kornilov, Nickel and Its Alloys, p. 117, vol. 1, translated from Russian, published for Nat. Science Foundation, Washington, by Israel Program for Scient. Translat., Jerusalem, 1963.

Reinacker et al., Zeitschrift fur Anorg, U. Alleg. Chemie, vol. 315, June 1962.

WINSTON A. DOUGLAS, Primary Examiner.

O. F. CRUTCHFIELD, Assistant Examiner.

U.S. DEPARTMENT OF COMMERCE
PATENT OFFICE
Washington, D.C. 20231

UNITED STATES PATENT OFFICE
CERTIFICATE OF CORRECTION

Patent No. 3,405,008                 October 8, 1968

Louis R. Dilworth et al.

It is certified that error appears in the above identified patent and that said Letters Patent are hereby corrected as shown below:

Column 4, line 47, claim reference numeral "5" should read -- 4 --.

Signed and sealed this 3rd day of March 1970.

(SEAL)
Attest:

Edward M. Fletcher, Jr.            WILLIAM E. SCHUYLER, JR.
Attesting Officer                 Commissioner of Patents